United States Patent
Xu et al.

(10) Patent No.: US 9,653,985 B2
(45) Date of Patent: May 16, 2017

(54) RESONANT CONVERTER AND CONTROLLING METHOD THEREOF

(71) Applicants: FSP-Powerland Technology Inc., Nanjing (CN); FSP TECHNOLOGY INC., Taoyuan County (TW)

(72) Inventors: Ming Xu, Nanjing (CN); Fei-Yue Duan, Nanjing (CN)

(73) Assignees: FSP-Powerland Technology Inc., Nanjing (CN); FSP TECHNOLOGY INC., Taoyuan (TW)

( * ) Notice: Subject to any disclaimer, the term of this patent is extended or adjusted under 35 U.S.C. 154(b) by 252 days.

(21) Appl. No.: 14/454,734

(22) Filed: Aug. 8, 2014

(65) Prior Publication Data

US 2015/0049520 A1    Feb. 19, 2015

(30) Foreign Application Priority Data

Aug. 15, 2013 (CN) .......................... 2013 1 0353646

(51) Int. Cl.
  *H02M 3/335* (2006.01)
  *H02M 1/32* (2007.01)
  *H02M 1/00* (2006.01)

(52) U.S. Cl.
  CPC .......... *H02M 1/32* (2013.01); *H02M 3/33569* (2013.01); *H02M 2001/0058* (2013.01); *Y02B 70/1433* (2013.01); *Y02B 70/1491* (2013.01); *Y02P 80/112* (2015.11)

(58) Field of Classification Search
  CPC ....... G05F 1/73; H02M 1/32; H02M 3/33569; H02M 2001/0058; H02M 3/335; H02H 3/20
  USPC .................................. 363/17, 21.02; 323/261
  See application file for complete search history.

(56) References Cited

U.S. PATENT DOCUMENTS

| | | | | |
|---|---|---|---|---|
| 9,331,584 B2 * | 5/2016 | Ohtake | ............ | H02M 3/33507 |
| 2009/0167208 A1 * | 7/2009 | Doroshev | ................ | H02J 1/10 |
| | | | | 315/294 |
| 2011/0292688 A1 * | 12/2011 | Zhang | .................... | H02M 1/32 |
| | | | | 363/21.02 |
| 2014/0286056 A1 * | 9/2014 | Yoon | ................ | H02M 3/33569 |
| | | | | 363/21.03 |

* cited by examiner

*Primary Examiner* — Jessica Han
*Assistant Examiner* — Lorena Bruner
(74) *Attorney, Agent, or Firm* — Jianq Chyun IP Office (57) ABSTRACT

A resonant converter and its controlling method are provided. The resonant converter includes a bridge switching circuit receiving a DC input voltage through its power terminal, a resonant and transforming circuit, a rectifying and filtering circuit, and an over-current protecting circuit. The resonant and transforming circuit has at least one resonant capacitor charged/discharged in response to the switching of the bridge switching circuit. The rectifying and filtering circuit rectifies and filters outputs of the resonant and transforming circuit, and generates a driving voltage accordingly. The over-current protecting circuit is coupled to the power terminal and crosses over the resonant capacitor to form a clamp path. The over-current protecting circuit detects a current flowing through the resonant and transforming circuit or a load and determines whether to conduct/cut off the clamp path according to the detection result to limit a cross voltage of the resonant capacitor within a first voltage range.

20 Claims, 7 Drawing Sheets

RESONANT CONVERTER AND CONTROLLING METHOD THEREOF

CROSS-REFERENCE TO RELATED APPLICATION

This application claims the priority benefit of China application serial no. 201310353646.3, filed on Aug. 15, 2013. The entirety of the above-mentioned patent application is hereby incorporated by reference herein and made a part of this specification.

BACKGROUND OF THE INVENTION

Field of Invention

The invention relates to a power converting technique and more particularly to a resonant converter and a controlling method thereof.

Description of Related Art

The development trend of direct current (DC) converters, similar to that of most power supply products, is toward high efficiency, high power density, high reliability, and low costs. Since resonant converters (e.g., LLC resonant converters, etc.) are capable of performing zero-voltage switching (ZVS) in the primary winding and zero-current switching (ZCS) in the secondary winding on the full-load range, the resonant converters have gradually been applied as DC converters in recent years.

As to the circuit design of resonant converters, the over-current protection is a crucial issue. In general, the resonant circuit may produce significant resonant current on the condition of over-load or short-circuit. If the resonant current is not limited or protected, the resonant converter is very much likely to be damaged by high current.

At present, one of the feasible solutions to realize the over-current protection is to add a clamp circuit to the resonant converter. By clamping the voltage across the resonant capacitor at the level of the input voltage, the over-current protection may be realized. The foregoing method is easy to execute, and periodic current limitation may be achieved without configuring any additional control circuit, which is powerless control. To be specific, in the resonant converter which adopts the aforesaid over-current protection, several clamping diodes are required to be added to the circuit, and the resonant circuit is designed to have the symmetrical structure.

However, in the resonant converter adopting the over-current protection mechanism, the voltage across the resonant capacitor is clamped according to the input voltage, so that the cross voltage of the resonant capacitor may change following the change to the input voltage, and the maximum voltage across the resonant capacitor can merely be the input voltage. Hence, the design of the resonant circuit has some limits, and the operation range of the resonant circuit may be affected.

In addition, when the resonant converter goes into the hold up time, since the cross voltage of the resonant capacitor is limited by the clamping diode, the stored energy of the resonant circuit may be decreased and thus decreasing the maximum gain of the output voltage. As a result, designers may have to use large capacitors to comply with the requirement of the hold up time, and problems regarding the increase in size and costs of the resonant converter may occur.

SUMMARY OF THE INVENTION

The invention provides a resonant converter and a switching power supply which allow the cross voltage of the resonant capacitor to be exempted from limitations of the clamping circuit in the normal operation state.

The resonant converter described in an embodiment of the invention is adapted to provide a driving voltage to a load. The resonant converter includes a bridge switching circuit, a resonant and transforming circuit, a rectifying and filtering circuit, and an over-current protecting circuit. The bridge switching circuit has a power terminal through which the bridge switching circuit receives a direct current (DC) input voltage. The resonant and transforming circuit is coupled to the bridge switching circuit, and the resonant and transforming circuit has at least one resonant capacitor which is charged or discharged in response to switching of the bridge switching circuit. The rectifying and filtering circuit is coupled to the resonant and transforming circuit. The rectifying and filtering circuit is configured to rectify and filter outputs of the resonant and transforming circuit and generate the driving voltage accordingly. The over-current protecting circuit is coupled to the power terminal, and the over-current protecting circuit is coupled across the resonant capacitor to form a clamp path. The over-current protecting circuit is configured to detect a current flowing through the resonant and transforming circuit or the load and determine whether to conduct the clamp path according to a detection result to limit a cross voltage of the resonant capacitor within a first voltage range.

In an embodiment of the invention, when the over-current protecting circuit detects that the current flowing through the resonant and transforming circuit or the load is larger than or equal to a pre-determined current, the over-current protecting circuit conducts the clamp path to limit the cross voltage of the at least one resonant capacitor within the first voltage range, and when the over-current protecting circuit detects that the current flowing through the resonant and transforming circuit or the load is smaller than the pre-determined current, the over-current protecting circuit cuts off the clamp path to exempt the cross voltage of the at least one resonant capacitor from the limitation within the first voltage range. The upper limit of the first voltage range is the DC input voltage.

In an embodiment of the invention, the over-current protecting circuit includes a clamping circuit, an over-current determining circuit, and a clamp switching circuit. The clamping circuit is coupled to the power terminal. The over-current determining circuit is configured to detect magnitudes of the current flowing through the resonant and transforming circuit or the load and generate an over-current determining signal accordingly. The clamp switching circuit is coupled between the clamping circuit and the at least one resonant capacitor, and the clamp switching circuit is turned on or off according to the over-current determining signal. The clamp path is formed by the clamp switching circuit.

In an embodiment of the invention, the rectifying and filtering circuit includes a first diode, a second diode, a third diode, and a fourth diode. A cathode terminal of the first diode is coupled to a cathode terminal of the third diode. An anode terminal of the first diode is coupled to a cathode terminal of the second diode. An anode terminal of the second diode is coupled to an anode terminal of the fourth diode, and an anode terminal of the third diode is coupled to a cathode terminal of the fourth diode. A filtering capacitor has a first terminal coupled to the cathode terminal of the first diode, the cathode terminal of the third diode, and one terminal of the load, and the filtering capacitor has a second terminal coupled to the anode terminal of the second diode, the anode terminal of the fourth diode, and the other terminal of the load.

In an embodiment of the invention, the bridge switching circuit includes a first switch transistor and a second switch transistor. A first terminal of the first switch transistor is the power terminal, and a control terminal of the first switch transistor receives a first control signal. A first terminal of the second switch transistor is coupled to a second terminal of the first switch transistor, a second terminal of the second switch transistor is coupled to a ground terminal, and a control terminal of the second switch transistor receives a second control signal.

In an embodiment of the invention, the resonant and transforming circuit includes a first resonant capacitor, a first resonant inductor, and a transformer. A first terminal of the first resonant capacitor is coupled to the ground terminal. A first terminal of the first resonant inductor is coupled to the second terminal of the first switch transistor and the first terminal of the second switch transistor. The transformer has a primary winding and a secondary winding. A common-polarity terminal of the primary winding is coupled to a second terminal of the first resonant inductor. An opposite-polarity terminal of the primary winding is coupled to a second terminal of the first resonant capacitor. A common-polarity terminal of the secondary winding is coupled to the anode terminal of the first diode and the cathode terminal of the second diode, and an opposite-polarity terminal of the secondary winding is coupled to the anode terminal of the third diode and the cathode terminal of the fourth diode.

In an embodiment of the invention, the clamping circuit includes a first clamping diode and a second clamping diode. A cathode terminal of the first clamping diode is coupled to the first terminal of the first switch transistor. An anode terminal of the second clamping diode is coupled to the ground terminal, and a cathode terminal of the second clamping diode is coupled to an anode terminal of the first clamping diode.

In an embodiment of the invention, the clamp switching circuit includes a switch. A first terminal of the switch is coupled to an anode terminal of the first clamping diode and the cathode terminal of the second clamping diode. A second terminal of the switch is coupled to the second terminal of the first resonant capacitor and the opposite-polarity terminal of the primary winding, and a control terminal of the switch is coupled to the over-current determining circuit.

In an embodiment of the invention, the resonant and transforming circuit includes a first resonant capacitor, a second resonant capacitor, a first resonant inductor, and a transformer. A first terminal of the first resonant capacitor is coupled to the ground terminal. A first terminal of the second resonant capacitor is coupled to a second terminal of the first resonant capacitor, and a second terminal of the second resonant is coupled to the first terminal of the first switch transistor. A first terminal of the first resonant inductor is coupled to the second terminal of the first switch transistor and the first terminal of the second switch transistor. The transformer has a primary winding and a secondary winding. A common-polarity terminal of the primary winding is coupled to a second terminal of the first resonant inductor. An opposite-polarity terminal of the primary winding is coupled to the second terminal of the first resonant capacitor and the first terminal of the second resonant capacitor. A common-polarity terminal of the secondary winding is coupled to the anode terminal of the first diode and the cathode terminal of the second diode, and an opposite-polarity terminal of the secondary winding is coupled to the anode terminal of the third diode and the cathode terminal of the fourth diode.

In an embodiment of the invention, the clamping circuit includes a first clamping diode and a second clamping diode. A cathode terminal of the first clamping diode is coupled to the first terminal of the first switch transistor and the first terminal of the first resonant capacitor. An anode terminal of the second clamping diode is coupled to the ground terminal, and a cathode terminal of the second clamping diode is coupled to an anode terminal of the first clamping diode.

In an embodiment of the invention, the clamp switching circuit includes a switch. A first terminal of the switch is coupled to the anode terminal of the first clamping diode and the cathode terminal of the second clamping diode. A second terminal of the switch is coupled to the second terminal of the first resonant capacitor and the first terminal of the second resonant capacitor, and a control terminal of the switch is coupled to the over-current determining circuit.

In an embodiment of the invention, the resonant and transforming circuit includes a first capacitor, a second capacitor, a first resonant capacitor, a first resonant inductor and a first transformer. A first terminal of the first capacitor is coupled to the first terminal of the first switch transistor. A first terminal of the second capacitor is coupled to a second terminal of the first capacitor, and a second terminal of the second capacitor is coupled to the ground terminal. A first terminal of the first resonant capacitor is coupled to the second terminal of the first switch transistor and the first terminal of the second switch transistor. A first terminal of the first resonant inductor is coupled to a second terminal of the first resonant capacitor. The first transformer has a primary winding and a secondary winding. A common-polarity terminal of the primary winding is coupled to a second terminal of the first resonant inductor, and an opposite-polarity terminal of the primary winding is coupled to the second terminal of the first capacitor and the first terminal of the second capacitor. A common-polarity terminal of the secondary winding is coupled to the anode terminal of the first diode and the cathode terminal of the second diode, and an opposite-polarity terminal of the secondary winding is coupled to the anode terminal of the third diode and the cathode terminal of the fourth diode.

In an embodiment of the invention, the clamping circuit includes a second transformer, a first clamping diode, and a second clamping diode. The second transformer has a primary winding and a secondary winding. A common-polarity terminal of the primary winding is coupled to the first terminal of the first resonant capacitor. An opposite-polarity terminal of the primary winding is coupled to the second terminal of the first resonant capacitor. An anode terminal of the first clamping diode is coupled to a common-polarity terminal of the secondary winding of the second transformer. An anode terminal of the second clamping diode is coupled to an opposite-polarity terminal of the secondary winding of the second transformer, and a cathode terminal of the second clamping diode is coupled to a cathode terminal of the first clamping diode.

In an embodiment of the invention, the clamp switching circuit includes a switch. A first terminal of the switch is coupled to the cathode terminal of the first clamping diode and the cathode terminal of the second clamping diode. A second terminal of the switch is coupled to the first terminal of the filtering capacitor, and a control terminal of the switch is coupled to the over-current determining circuit.

In an embodiment of the invention, the bridge switching circuit includes a first switch transistor, a second switch transistor, a third switch transistor, and a fourth switch transistor. A first terminal of the first switch transistor is the power terminal, and a control terminal of the first switch transistor receives a first control signal. A first terminal of the second switch transistor is coupled to a second terminal of the first switch transistor. A second terminal of the second switch transistor is coupled to a ground terminal, and a control terminal of the second switch transistor receives a second control signal. A first terminal of the third switch transistor is coupled to the first terminal of the first switch transistor, and a control terminal of the third switch transistor receives a third control signal. A first terminal of the fourth switch transistor is coupled to a second terminal of the third switch transistor. A second terminal of the fourth switch transistor is coupled to the ground terminal, and a control terminal of the fourth switch transistor receives a fourth control signal.

In an embodiment of the invention, the resonant and transforming circuit includes a first resonant capacitor, a first resonant inductor, a second resonant inductor, and a transformer. A first terminal of the first resonant inductor is coupled to the second terminal of the first switch transistor and the first terminal of the second switch transistor. A first terminal of the second resonant inductor is coupled to the second terminal of the third switch transistor and the first terminal of the fourth switch transistor. The transformer has a first primary winding, a second primary winding, and a secondary winding. A common-polarity terminal of the first primary winding is coupled to a first terminal of the first resonant capacitor. An opposite-polarity terminal of the first primary winding is coupled to a second terminal of the first resonant inductor. A common-polarity terminal of the second primary winding is coupled to a second terminal of the second resonant inductor. An opposite-polarity terminal of the second primary winding is coupled to a second terminal of the first resonant capacitor. A common-polarity terminal of the secondary winding is coupled to the anode terminal of the first diode and the cathode terminal of the second diode, and an opposite-polarity terminal of the secondary winding is coupled to the anode terminal of the third diode and the cathode terminal of the fourth diode.

In an embodiment of the invention, the clamping circuit includes a first clamping diode, a second clamping diode, a third clamping diode, and a fourth clamping diode. A cathode terminal of the first clamping diode is coupled to the first terminal of the first switch transistor. An anode terminal of the second clamping diode is coupled to the ground terminal, and a cathode terminal of the second clamping diode is coupled to an anode terminal of the first clamping diode. A cathode terminal of the third clamping diode is coupled to the cathode terminal of the first clamping diode. An anode terminal of the fourth clamping diode is coupled to the ground terminal, and a cathode terminal of the fourth clamping diode is coupled to an anode terminal of the third clamping diode.

In an embodiment of the invention, the clamp switching circuit includes a first switch and a second switch. A first terminal of the first switch is coupled to the anode terminal of the first clamping diode and the cathode terminal of the second clamping diode. A second terminal of the first switch is coupled to the first terminal of the first resonant capacitor, and a control terminal of the first switch is coupled to the over-current determining circuit. A first terminal of the second switch is coupled to the anode terminal of the third clamping diode and the cathode terminal of the fourth clamping diode. A second terminal of the second switch is coupled to the second terminal of the first resonant capacitor, and a control terminal of the second switch is coupled to the over-current determining circuit.

A controlling method of a resonant converter described in an embodiment of the invention includes following steps: controlling switching of the bridge switching circuit, in which the bridge switching circuit receives a DC input voltage through a power terminal; charging or discharging at least one resonant capacitor in response to the switching of the bridge switching circuit; rectifying and filtering outputs of the resonant and transforming circuit by a rectifying and filtering circuit and generating a driving voltage to drive a load accordingly; detecting a current flowing through the resonant and transforming circuit or a load; and determining whether to conduct a clamp path according to a detection result to limit a cross voltage of the at least one resonant capacitor within a first voltage range.

In an embodiment of the invention, the step of determining whether to conduct the clamp path according to the detection result to limit the cross voltage of the at least one resonant capacitor within the first voltage range includes following steps: determining whether the current flowing through the resonant and transforming circuit or the load is larger than or equal to a pre-determined current or not; if the current flowing through the resonant and transforming circuit or the load is determined to be larger than or equal to the pre-determined current, the over-current protecting circuit conducts the clamp path to limit the cross voltage of the at least one resonant capacitor within the first voltage range; and if the current flowing through the resonant and transforming circuit or the load is determined to be smaller than the pre-determined current, the over-current protecting circuit cuts off the clamp path to exempt the cross voltage of the at least one resonant capacitor from the limitation within the first voltage range. Here, the upper limit of the first voltage range is the DC input voltage.

In view of the above, a resonant converter and a controlling method thereof are provided herein. The resonant converter may determine whether the over-current phenomenon occurs at the load by detecting the current on its primary winding or the load. The resonant converter conducts the clamp path to provide the over-current protection if the over-current phenomenon occurs at the load, and cuts off the clamp path to exempt the resonant capacitance from being limited by the DC input voltage when the over-current phenomenon does not occur at the load. Therefore, the resonant converter may be free of extra limitation in terms of determination the circuit parameters and the operation range, and the difficult and costs of overall circuit design may be further reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

An embodiment of the invention provides a resonant converter and a controlling method thereof. The resonant converter may determine whether the over-current phenomenon occurs at a load by detecting a current on its primary winding or the load. The resonant converter conducts a clamp path to provide the over-current protection when the over-current phenomenon occurs at the load, and the resonant converter cuts off the clamp path to exempt the resonant capacitance from being limited by a DC input voltage when the over-current phenomenon does not occur at the load. Therefore, the resonant converter may be free from extra limitation in terms of determination the circuit parameters and the operation range, and the difficulty and costs of overall circuit design may be further reduced. In order to make the disclosure more comprehensible, embodiments are described below as examples showing that the disclosure can be actually realized. The embodiments provided herein are only for an illustrative purpose instead of limiting the scope of the disclosure. Moreover, wherever possible, the same reference numbers are used in the drawings and the description of embodiments to refer to the same or like parts.

Figure 1:
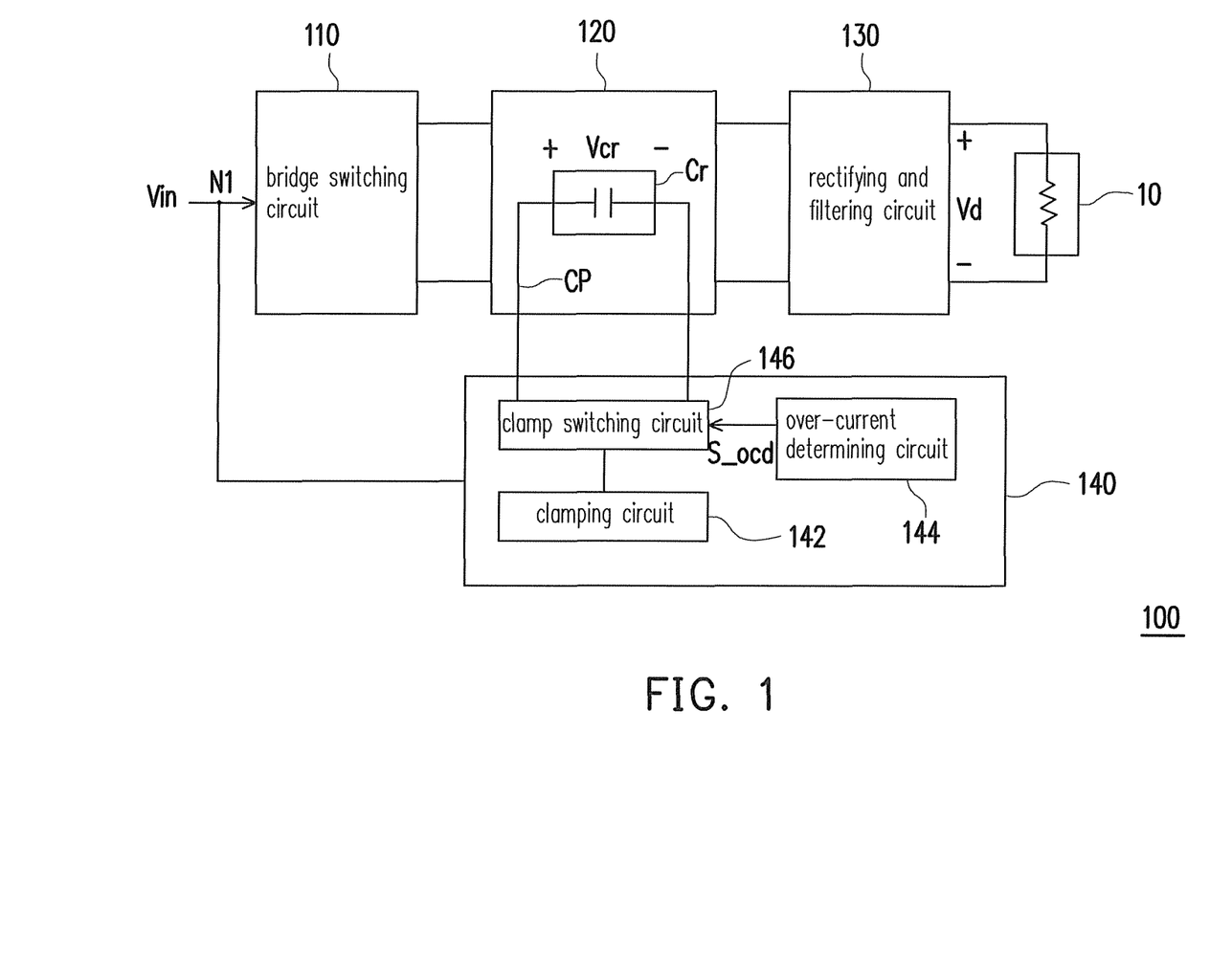
FIG. 1 is a schematic functional block diagram of a resonant converter according to an embodiment of the invention.

FIG. 1 is a schematic functional block diagram of a resonant converter according to an embodiment of the invention. According to the present embodiment, a resonant converter 100 is adapted to perform the DC-DC conversion on a DC input voltage Vin and provide a driving voltage Vd to drive a load 10 accordingly. Please refer to FIG. 1. The resonant converter 100 includes a bridge switching circuit 110, a resonant and transforming circuit 120, a rectifying and filtering circuit 130, and an over-current protecting circuit 140.

The bridge switching circuit 110 has a power terminal N1, and the bridge switching circuit 110 receives the DC input voltage Vin through the power terminal N1. According to the present embodiment, the bridge switching circuit 110 may be, for example, an asymmetrical half-bridge switching circuit, a symmetrical half-bridge switching circuit, or a full-bridge switching circuit. However, the invention is not limited thereto, and different implementations of the bridge switching circuit 110 are further explained in the following embodiments.

The resonant and transforming circuit 120 is coupled to the bridge switching circuit 110. The resonant and transforming circuit 120 may have one or more resonant capacitors Cr based on the type of the resonant converter 100 being implemented. More specifically, the resonant and transforming circuit 120 further includes a resonant inductor and a transformer (not shown, but will be described in the embodiments below according to the different implementations of the resonant converter), where a resonant tank may be constituted by the resonant capacitor Cr and the resonant inductor, and the resonant capacitor Cr is charged or discharged in response to the switching of the bridge switching circuit 110. Thus, the rear-stage transformer may perform the boost/buck conversion on outputs of the resonant tank.

The rectifying and filtering circuit 130 is coupled to the resonant and transforming circuit 120. The rectifying and filtering circuit 130 is configured to rectify and filter outputs of the resonant and transforming circuit 120 and generate a driving voltage Vd accordingly. According to the present embodiment, the rectification function of the rectifying and filtering circuit 130 may be implemented by means of the structural design of a bridge rectifier (not shown), and the filter function of the rectifying and filtering circuit 130 may be implemented by means of a filtering capacitor (not shown) coupled to the load 10 in parallel. However, the invention is not limited thereto.

The over-current protecting circuit 140 is coupled to the power terminal N1 and is coupled between two terminals of the resonant capacitor Cr to form a clamp path CP. According to the present embodiment, the over-current protecting circuit 140 may be configured to detect the current flowing through the resonant and transforming circuit 120 or the load 10 and determine whether to conduct the clamp path CP according to the detection result to limit the cross voltage Vcr of the resonant capacitor Cr within a first voltage range.

In detail, when the over-current protecting circuit 140 detects that the current flowing through the resonant and transforming circuit 120 or the load 10 is larger than or equal to the a pre-determined current, the over-current protecting circuit 140 may determine that the load 10 encounters an over-current phenomenon (i.e., the load 10 is in a short-circuit state or in other unexpected states, so that the current at the load 10 is too high). At this time, the over-current protecting circuit 140 may conduct the clamp path CP, so that the over-current protecting circuit 140 limits the cross voltage Vcr of the resonant capacitor Cr within the voltage range lower than the DC input voltage Vin (i.e., the upper limit of the voltage range is the DC input voltage Vin) and therefore limits the current flowing through the load 10.

On the other hand, when the over-current protecting circuit 140 detects that the current flowing through the resonant and transforming circuit 120 or the load 10 is smaller than the pre-determined current, the over-current protecting circuit 140 may determine that the load 10 does not encounter the over-current phenomenon. At this time, the over-current protecting circuit 140 may cut off the clamp path CP, so that the cross voltage Vcr of the resonant capacitor Cr is not limited by the over-current protecting circuit 140 (i.e., the cross voltage Vcr of the resonant capacitor Cr does not have to be lower than the voltage range of the DC input voltage Vin.). In other words, if the over-current phenomenon of the load 10 does not occur, the cross voltage Vcr of the resonant capacitor Cr may be larger than the DC input voltage Vin.

In more detail, the over-current protecting circuit 140 includes a clamping circuit 142, an over-current determining circuit 144, and a clamp switching circuit 146. The clamping circuit 142 is coupled to the power terminal N1. The over-current determining circuit 144 detects magnitudes of the current flowing through the resonant and transforming circuit or the load and generates an over-current determining signal S_ocd accordingly. The clamp switching circuit 146 is coupled between the clamping circuit 142 and the resonant capacitor Cr and is turned on or off according to the over-current determining signal S_ocd.

According to the present embodiment, the clamp path CP is generated via the clamp switching circuit 146. Therefore, when the clamp switching circuit 146 is turned on in response to the over-current determining signal S_ocd, the clamp path CP may be conducted simultaneously, so that the clamping circuit 142 may limit the magnitudes of the voltage Vcr according to the DC input voltage Vin. On the contrary, when the clamp switching circuit 146 is turned off in response to the over-current determining signal S_ocd, the clamp path CP may be cut off simultaneously, so that the voltage Vcr is not limited by the clamping circuit 142.

In other words, based on the structure of the resonant converter 100 of the embodiment depicted in FIG. 1, when the over-current determining circuit 144 determines that the secondary side of the resonant converter 100 encounters the over-current phenomenon, the over-current protecting circuit 140 may limit the cross voltage Vcr of the resonant capacitor Cr within the DC input voltage Vin through the clamping circuit 142 and the clamp switching circuit 144 together, so as to achieve the effect of inhibiting the current stress of the switch disposed in the primary side of the resonant converter 100. On the contrary, if the over-current determining circuit 144 determines that the resonant converter 100 works normally, the over-current protecting circuit 140 may cut off the clamp path CP by turning off the clamp switching circuit 144, so that the cross voltage Vcr of the resonant capacitor Cr is not limited by the clamping circuit 142.

Therefore, compared to the design of the circuit parameters and the operation range of the traditional resonant converter encountering the over-current protection mechanism, the design of the circuit parameters and the operation range of the resonant converter 100 described in the present embodiment may not be subject to the limitation and the influence of the DC input voltage Vin on the resonant capacitor Cr, so that the circuit parameters and the operation range of the resonant converter 100 described in the present embodiment may have more design choices, and the difficulty of design may be further lowered.

Figure 2:
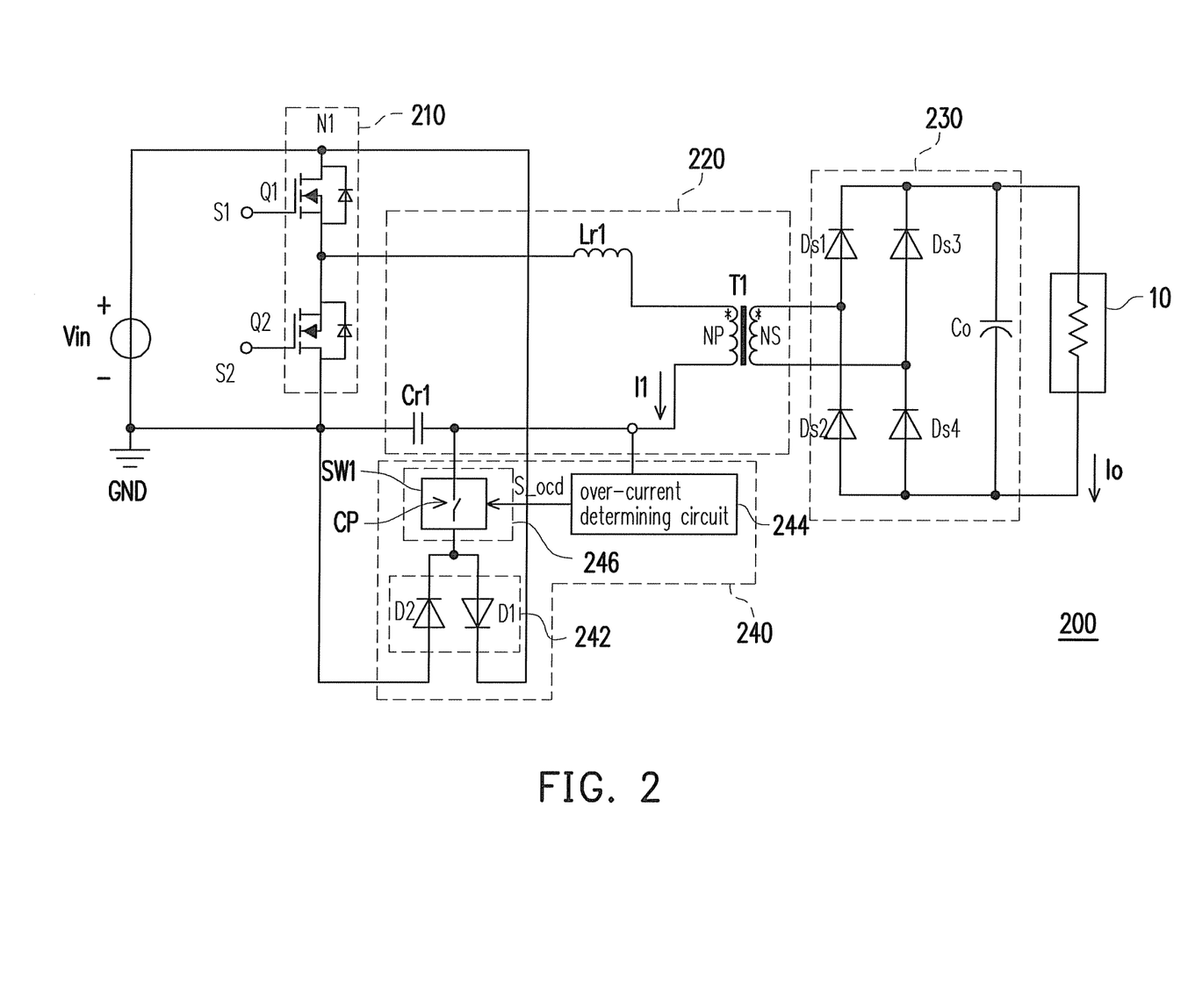
FIG. 2 to FIG. 5 are schematic circuit diagrams of a resonant converter according to several embodiments of the invention.
Figure 3:
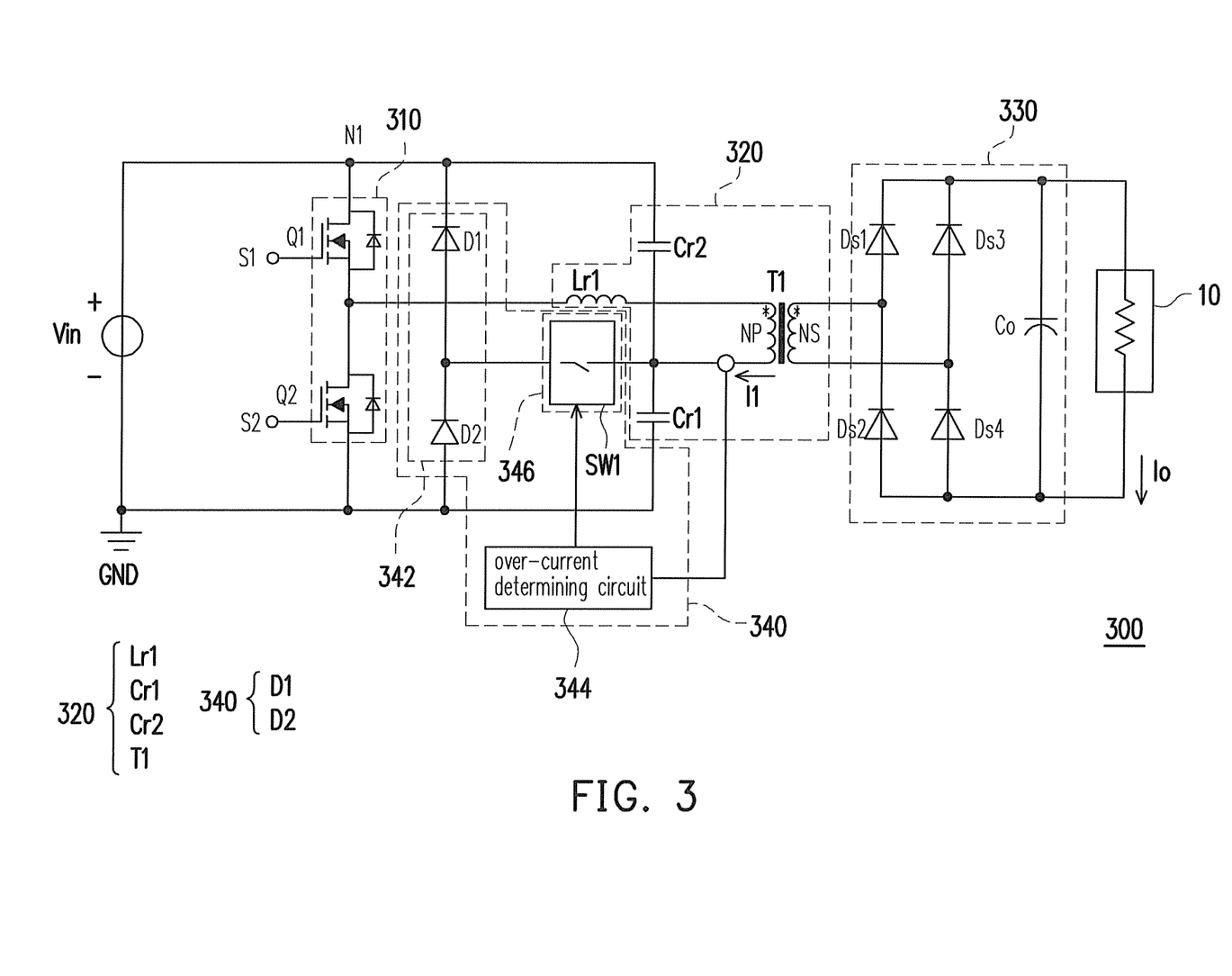
Figure 4:
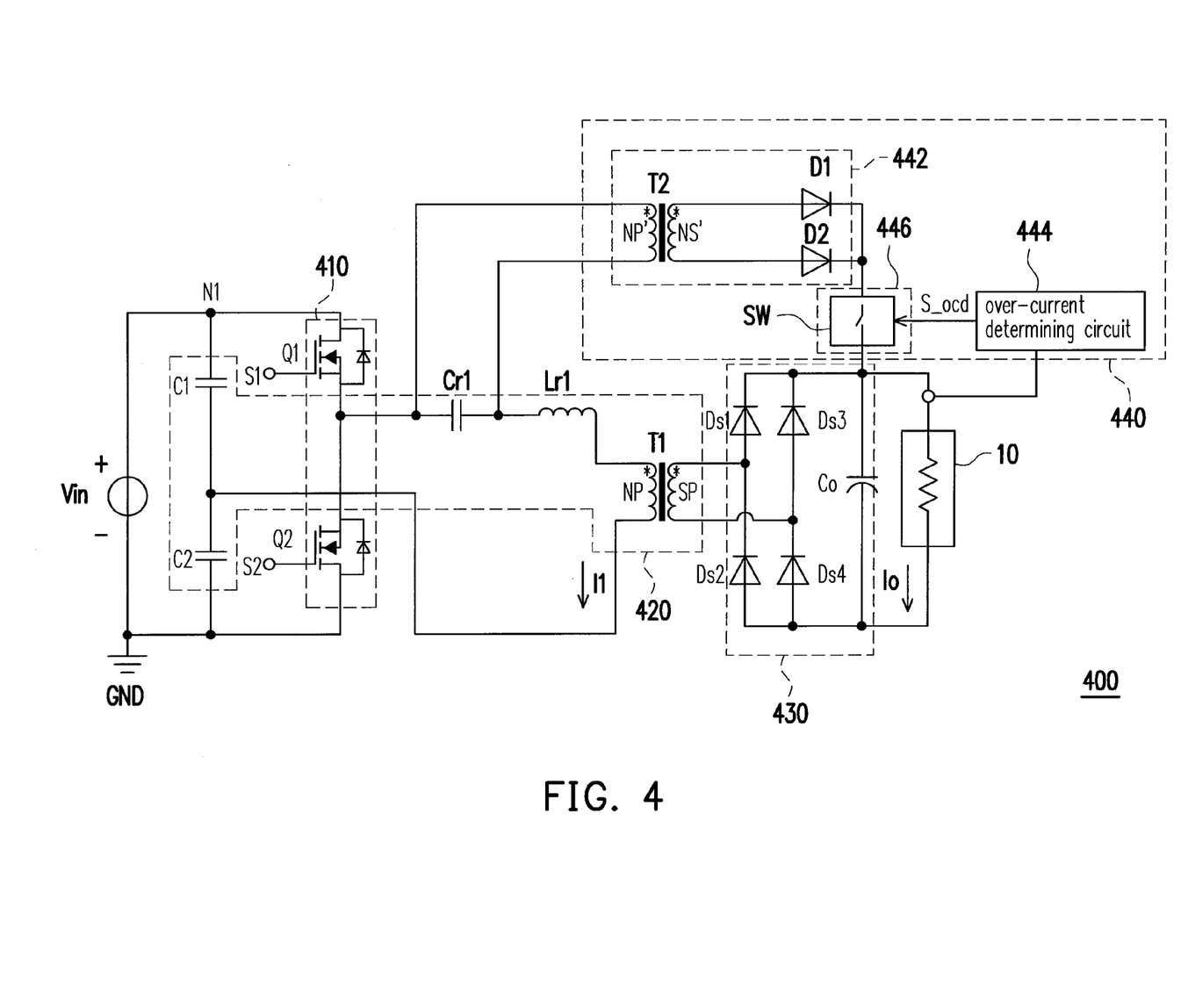
Figure 5:
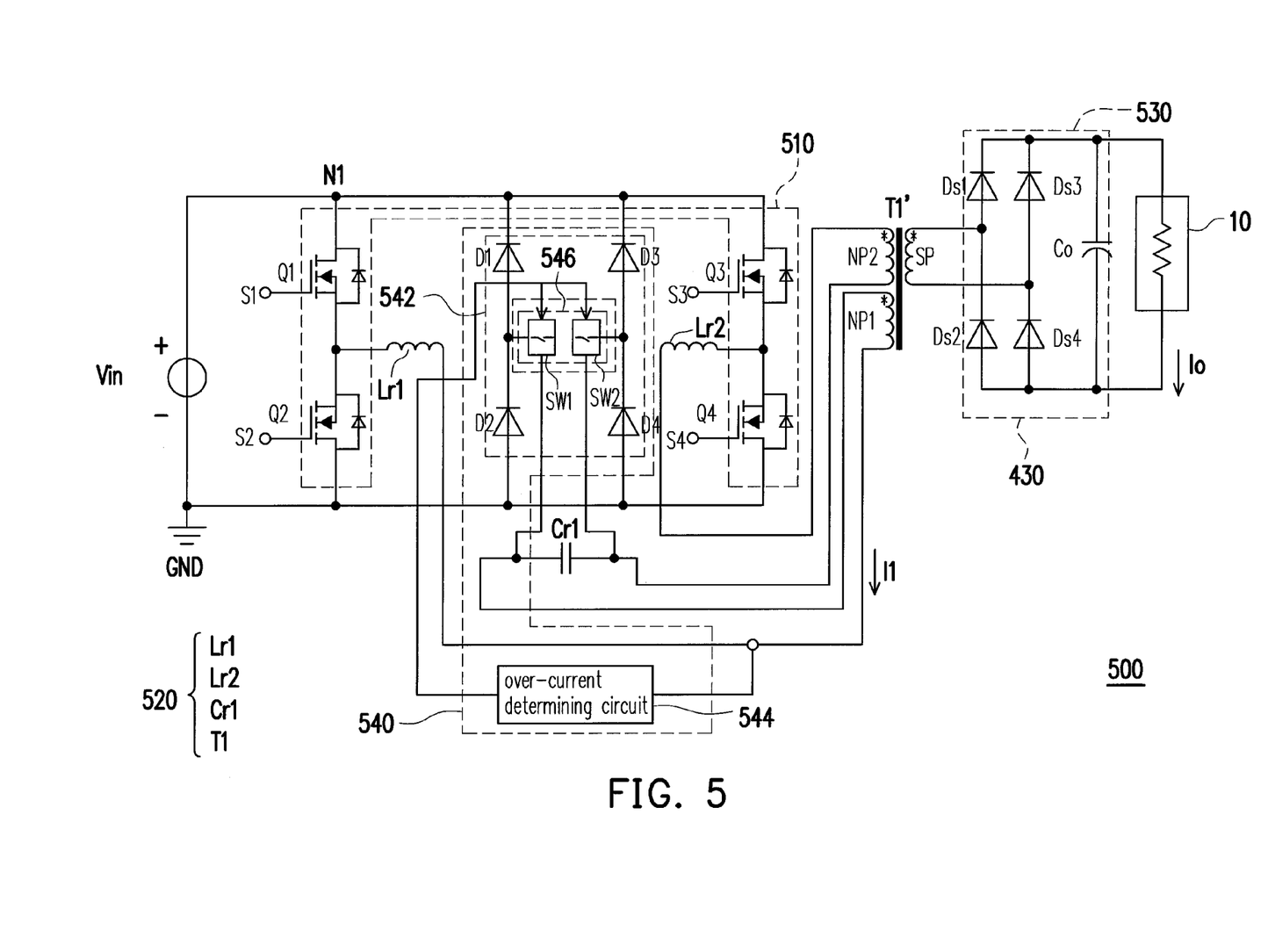

In order to clearly describe the embodiment of the invention, different implementations of the specific circuit structures of the resonant converter depicted in FIG. 2 to FIG. 5 are respectively described below. FIG. 2 is a schematic circuit diagram of an asymmetrical half-bridge resonant converter. FIG. 3 and FIG. 4 are schematic circuit diagrams of a symmetrical half-bridge resonant converter. FIG. 5 is a schematic circuit diagram of a full-bridge resonant converter. In the embodiments depicted in FIG. 2 to FIG. 5, the switch transistors (e.g., Q1 to Q4) of the bridge switching circuit are the N-type power transistor. However, the invention is not limited thereto.

Please refer to FIG. 2. The resonant converter 200 includes a bridge switching circuit 210, a resonant and transforming circuit 220, a rectifying and filtering circuit 230, and an over-current protecting circuit 240. According to the present embodiment, the bridge switching circuit 210 includes switch transistors Q1 and Q2. The resonant and transforming circuit 220 includes a first resonant capacitor Cr1, a first resonant inductor Lr1, and a transformer T1. The rectifying and filtering circuit 230 includes diodes Ds1 to Ds4 and a filtering capacitor Co. The over-current protecting circuit 240 includes a clamping circuit 242 composed of clamping diodes D1 and D2, an over-current determining circuit 244, and a clamp switching circuit 246 composed of the switch SW1.

In the bridge switching circuit 210, a drain of the switch transistor Q1 is the power terminal that receives the DC input voltage Vin, and a source of the switch transistor Q1 is coupled to a drain of the switch transistor Q2. A source of the switch transistor Q2 is coupled to the ground terminal GND. A gate of the switch transistor Q1 receives a control signal S1. A gate of the switch transistor Q2 receives a control signal S2. The control signals S1 and S2 may be pulse width modulation (PWM) signals. In view of the above, the switch transistors Q1 and Q2 may be turned on or off in response to the control signals S1 and S2 respectively and switchedly provide the DC input voltage Vin to the resonant and transforming circuit 220.

In the resonant and transforming circuit 220, a first terminal of the first resonant capacitor Cr1 is coupled to the ground terminal GND. A first terminal of the first resonant inductor Lr1 is coupled to the source of the switch transistor Q1 and the drain of the switch transistor Q2. The transformer T1 has a primary winding NP and a secondary winding SP. A common-polarity terminal (i.e., the dotted terminal) of the primary winding NP is coupled to a second terminal of the first resonant inductor Lr1, and an opposite-polarity terminal (i.e., the non-dotted terminal) of the primary winding NP is coupled to a second terminal of the first resonant capacitor Cr1.

In the rectifying and filtering circuit 230, a cathode terminal and an anode terminal of the diode Ds1 are respectively coupled to a cathode terminal of the diode Ds3 and a cathode terminal of the diode Ds2, an anode terminal of the diode Ds2 is coupled to an anode terminal of diode Ds4, and an anode terminal of the diode Ds3 is coupled to a cathode terminal of the diode Ds4, in which the anode terminal of the diode Ds1 and the cathode terminal of the diode Ds2 are together coupled to a common-polarity terminal of the secondary winding SP of the transformer T1, and the anode terminal of the diode Ds3 and the cathode terminal of the diode Ds4 are together coupled to an opposite-polarity terminal of the secondary winding SP of the transformer T1. A first terminal of the filtering capacitor Co is coupled to the cathode terminal of the diodes Ds1 and Ds3 and is coupled to one terminal of the load 10. A second terminal of the filtering capacitor Co is coupled to the anode terminal of the diode Ds2 and Ds4 and is coupled to the other terminal of the load 10.

It should be noted that although the rectifying and filtering circuit 230 is exemplarily implemented by a full-bridge rectifier constituted by the diode Ds1 to Ds4 according to the present embodiment, the invention is not limited thereto, however. In other embodiments, the rectifying and filtering circuit 230 may also have the synchronous rectifier (SR) that is constituted by power transistors and serves to replace the diode Ds1 to Ds4 respectively, so as to form a self-driven or externally-driven synchronous rectifying circuit, which is determined according to actual design/application requirements.

In the over-current protecting circuit 240, a cathode terminal of the clamping diode D1 is coupled to the drain of the switch transistor Q1 (i.e., the power terminal N1). An anode terminal of the clamping diode D2 is coupled to the ground terminal GND, and a cathode terminal of the clamping diode D2 is coupled to an anode terminal of the clamping diode D1. The over-current determining circuit 244 detects the current I1 flowing through the primary winding NP of the transformer T1 and generates an over-current determining signal S_ocd accordingly. A first terminal of the switch SW1 is coupled to the anode terminal of the clamping diode D1 and the cathode terminal of the clamping diode D2. A second terminal of the switch SW1 is coupled to a second terminal of first resonant capacitor Cr1 and the opposite-polarity terminal of the primary winding NP of the transformer T1, and a control terminal of the switch SW1 is coupled to the over-current determining circuit 244 to receive the over-current determining signal S_ocd.

According to the present embodiment, note that the over-current determining circuit 244 determines whether the load 10 encounters the over-current phenomenon by detecting the primary side current of the resonant converter 200 (i.e., the current I1 flowing through the primary winding NP), but the invention is not limited thereto. In other embodiments, the over-current determining circuit 244 also may determine whether the load 10 encounters the over-current phenomenon by detecting the secondary side current of the resonant converter 200 (i.e., the current Io flowing through the load 10).

In detail, if the resonant converter 200 works normally (i.e., the load 10 does not encounter the over-current phenomenon), the switch SW1 may be turned off in response to the over-current determining signal S_ocd, and the clamp path CP composed of the switch SW1 is also cut off correspondingly. At this time, the cross voltage across the first resonant capacitor Cr1 is not limited by clamping diodes D1 and D2. That is to say, the first resonant capacitor Cr1 may be charged to a level higher than the voltage level of the DC input voltage Vin. On the other hand, if the over-current phenomenon of the load 10 occurs, the switch SW1 may be turned on in response to the over-current determining signal S_ocd, so that the clamp path CP generated by the switch SW1 is also conducted on correspondingly. At this time, the cross voltage of the first resonant capacitor Cr1 may be limited by the clamping diodes D1 and D2. Namely, the maximum cross voltage of the first resonant capacitor Cr1 may be limited to be at the voltage level of the DC input voltage Vin.

The traditional resonant converter only uses the clamping circuit to achieve the over-current protection. By contrast, in case that the resonant converter 200 works normally, the cross voltage of the first resonant capacitor Cr1 is not limited by the clamping diode D1 and D2, so that the designers of the resonant circuit need not additionally consider the influence of the DC input voltage Vin on the first resonant capacitor Cr1. In addition, because the cross voltage of the first resonant capacitor Cr1 is not limited by the clamping diodes D1 and D2, the storage energy of the entire resonant circuit does not decrease, and therefore the requirement of the hold up time may be satisfied without using large capacitors in the resonant converter design.

Please refer to FIG. 3. The difference between the resonant converter 300 provided in the present embodiment and the resonant converter 200 provided in the previous embodiment depicted in FIG. 2 lies in that the resonant converter 300 in the present embodiment has the symmetrical half-bridge circuit structure. The resonant converter 300 includes a bridge switching circuit 310, a resonant and transforming circuit 320, a rectifying and filtering circuit 330, and an over-current protecting circuit 340, and the structures and arrangement of the bridge switching circuit 310, the rectifying and filtering circuit 330, and the over-current protecting circuit 340 are substantially equal to those described in the embodiment depicted in FIG. 2, so that the repeated descriptions may be referred to as those provided in the embodiment depicted in FIG. 2 and are thus omitted herein. Said difference is described below.

According to the present embodiment, the resonant and transforming circuit 320 further includes the second resonant capacitor Cr2 that is coupled between the power terminal N1 and a second terminal of the first resonant capacitor Cr1 to form a symmetrical half-bridge circuit structure. With said circuit structure, the over-current protecting circuit 340 may also detect the current I1 flowing through the primary side winding NP of the transformer T1 (which is not limited thereto) to determine whether the over-current phenomenon of the load 10 occurs and determine whether to turn on the switch SW1 to limit the cross voltage of the first resonant capacitor Cr1 and the second resonant capacitor Cr2 accordingly.

Please refer to FIG. 4. The resonant converter 400 described in the embodiment is another possible implementation form of a symmetrical half-bridge resonant converter. The resonant converter 400 includes a bridge switching circuit 410, a resonant and transforming circuit 420, a rectifying and filtering circuit 430, and an over-current protecting circuit 440, and the structures and arrangement of the bridge switching circuit 410 and the rectifying and filtering circuit 430 are substantially equal to those described in the embodiment depicted in FIG. 2, so that the repeated descriptions may be referred to as those provided in the embodiment depicted in FIG. 2 and are omitted herein. Said difference is described below.

According to the present embodiment, the resonant and transforming circuit 420 includes a first resonant capacitor Cr1, a first capacitor C1, a second capacitor C2, a first resonant inductor Lr1, and a transformer T1. The over-current protecting circuit 440 includes the clamping circuit 442 composed of the clamping diodes D1 and D2 and a transformer T2, an over-current determining circuit 444, and a clamp switching circuit 446 composed of the switch SW1.

In the resonant and transforming circuit 420, a first terminal of the first capacitor C1 is coupled to a drain of switch transistor Q1 (i.e., the power terminal N1). A first terminal of the second capacitor C2 is coupled to a second terminal of the first capacitor C1, and a second terminal of the second capacitor C2 is coupled to the ground terminal GND. A first terminal of the first resonant capacitor Cr1 is coupled to a source of the switch transistor Q1 and a drain of the switch transistor Q2. A first terminal of the first resonant inductor Lr1 is coupled to a second terminal of the first resonant capacitor Cr1. A common-polarity terminal of the primary winding Np of the transformer T1 is coupled to a second terminal of the first resonant inductor Lr1, and an opposite-polarity terminal of the primary winding NP is coupled to the second terminal of the first capacitor C1 and the first terminal of the second capacitor C2. A common-polarity terminal and an opposite-polarity terminal of the secondary winding SP of the transformer T1 are respectively coupled to an anode terminal of the diode Ds1 and an anode terminal of the diode Ds3 of the rectifying and filtering circuit 430.

In the over-current protecting circuit 440, a common-polarity terminal and an opposite-polarity terminal of the primary winding NP' of the transformer T2 are respectively coupled to two terminals of the first resonant capacitor Cr1. An anode terminal of the clamping diode D1 is coupled to a common-polarity terminal of the secondary winding SP' of the transformer T2. An anode terminal of the clamping diode D2 is coupled to the opposite-polarity terminal of the secondary winding SP' of the transformer T2, and a cathode terminal of the clamping diode D1 is coupled to a cathode terminal of the clamping diode D2. The over-current protecting circuit 444 detects the current Io flowing through the load 10 and generates the over-current determining signal S_ocd accordingly. The first terminal of the switch SW1 is coupled to the cathode terminal of the clamping diodes D1 and D2. The second terminal of the switch SW1 is coupled to a first terminal of a filtering capacitor Co of the rectifying and filtering circuit 430. The control terminal of switch SW1 is coupled to the over-current determining circuit 444 to receive the over-current determining signal S_ocd.

Based on said circuit configuration, the over-current protecting circuit 440 detects the current Io flowing through the load 10 (which is not limited thereto) to determine whether the over-current phenomenon of the load 10 occurs and determine whether to turn on the switch SW1 to limit the cross voltage of the first resonant capacitor Cr1.

Please refer to FIG. 5. The difference between the resonant converter 500 described in the present embodiment and the resonant converters 200 to 400 respectively provided in the embodiments depicted in FIG. 2 to FIG. 4 lies in that the resonant converter 500 described in the present embodiment has the full-bridge circuit structure. The resonant converter 500 includes a bridge switching circuit 510, a resonant and transforming circuit 520, a rectifying and filtering circuit 530, and an over-current protecting circuit 540. According to the present embodiment, the bridge switching circuit 510 includes switch transistors Q1 to Q4. The resonant and transforming circuit 520 includes a first resonant capacitor Cr1, a first resonant inductor Lr1, a second resonant inductor Lr2, and a transformer T1. The rectifying and filtering circuit 530 is similar to the rectifying and filtering circuit 230, 330, or 430. The over-current protecting circuit 540 includes a clamping circuit 542 composed of clamping diodes D1 to D4, an over-current determining circuit 544, and a clamp switching circuit 546 composed of switches SW1 and SW2.

In the bridge switching circuit 510, a drain of the switch transistor Q1 is a power terminal that receives the DC input voltage Vin, and a source of the switch transistor Q1 is coupled to a drain of the switch transistor Q2. A drain of the switch transistor Q3 is coupled to the drain of the switch transistor Q1, and a source of the switch transistor Q3 is coupled to a drain of the switch transistor Q4. A source of the switch transistor Q2 and a source of the switch transistor Q4 are together coupled to the ground terminal GND. Gates of the switch transistors Q1 to Q4 respectively receive control signals S1 to S4, and the control signals S1 to S4 may be respectively the PWM signal. Thereby, the switch transistors Q1 to Q4 may be turned on or off in response to the control signals S1 to S4 and switchedly provide the DC input voltage Vin to the resonant and transforming circuit 520.

In the resonant and transforming circuit 520, a first terminal of the first resonant inductor Lr1 is coupled to the source of the switch transistor Q1 and the drain of the switch transistor Q2. A first terminal of the second resonant inductor Lr2 is coupled to the source of the switch transistor Q3 and the drain of the switch transistor Q4. The transformer T1' has a first primary winding NP1, a second primary winding NP2, and a secondary winding SP. A common-polarity terminal of the first primary winding NP1 is coupled to the first terminal of the first resonant capacitor Cr1, and an opposite-polarity terminal of the first primary winding NP1 is coupled to a second terminal of the first resonant capacitor Lr1. A common-polarity terminal of the second primary winding NP2 is coupled to a second terminal of the second resonant inductor Lr2, and an opposite-polarity terminal of the second primary winding NP2 is coupled to a second terminal of the first resonant capacitor Cr1. A common-polarity terminal and an opposite-polarity terminal of the secondary winding SP are respectively coupled to an anode terminal of the diodes Ds1 and Ds3 of the rectifying and filtering circuit 530.

In the over-current protecting circuit 540, a cathode terminal of the clamping diodes D1 and D3 are together coupled to a drain of switch transistor Q1 (i.e., the power terminal N1), an anode terminal of the clamping diode D1 is coupled to a cathode terminal of the clamping diode D2, anode terminals of the clamping diodes D2 and D4 are together coupled to the ground terminal GND, and an anode terminal of the clamping diode D3 is coupled to a cathode terminal of the clamping diode D4. The over-current determining circuit 544 detects the current I1 flowing through the primary winding NP1 of the transformer T1' and generates an over-current determining signal S_ocd accordingly. A first terminal of the switch SW1 is coupled to the anode terminal of the clamping diode D1 and the cathode terminal of the clamping diode D2, and the second terminal of the switch SW1 is coupled to the first terminal of the first resonant capacitor Cr1. The first terminal of the switch SW2 is coupled to the anode terminal of the clamping diode D3 and the cathode terminal of the clamping diode D4, and the second terminal of the switch SW2 is coupled to a second terminal of the first resonant capacitor Cr1. Control terminals of the switches SW1 and SW2 are coupled to the over-current determining circuit 544 to together receive the over-current determining signal S_ocd.

Based on the circuit configuration provided in the present embodiment, the over-current protecting circuit 540 detects the current I1 flowing through the first primary winding NP1 (which is not limited thereto) to determine whether the over-current phenomenon of the load 10 occurs and determine whether to turn on the switches SW1 and SW2 at the same time accordingly to limit the cross voltage of the first resonant capacitor Cr1.

Figure 6:
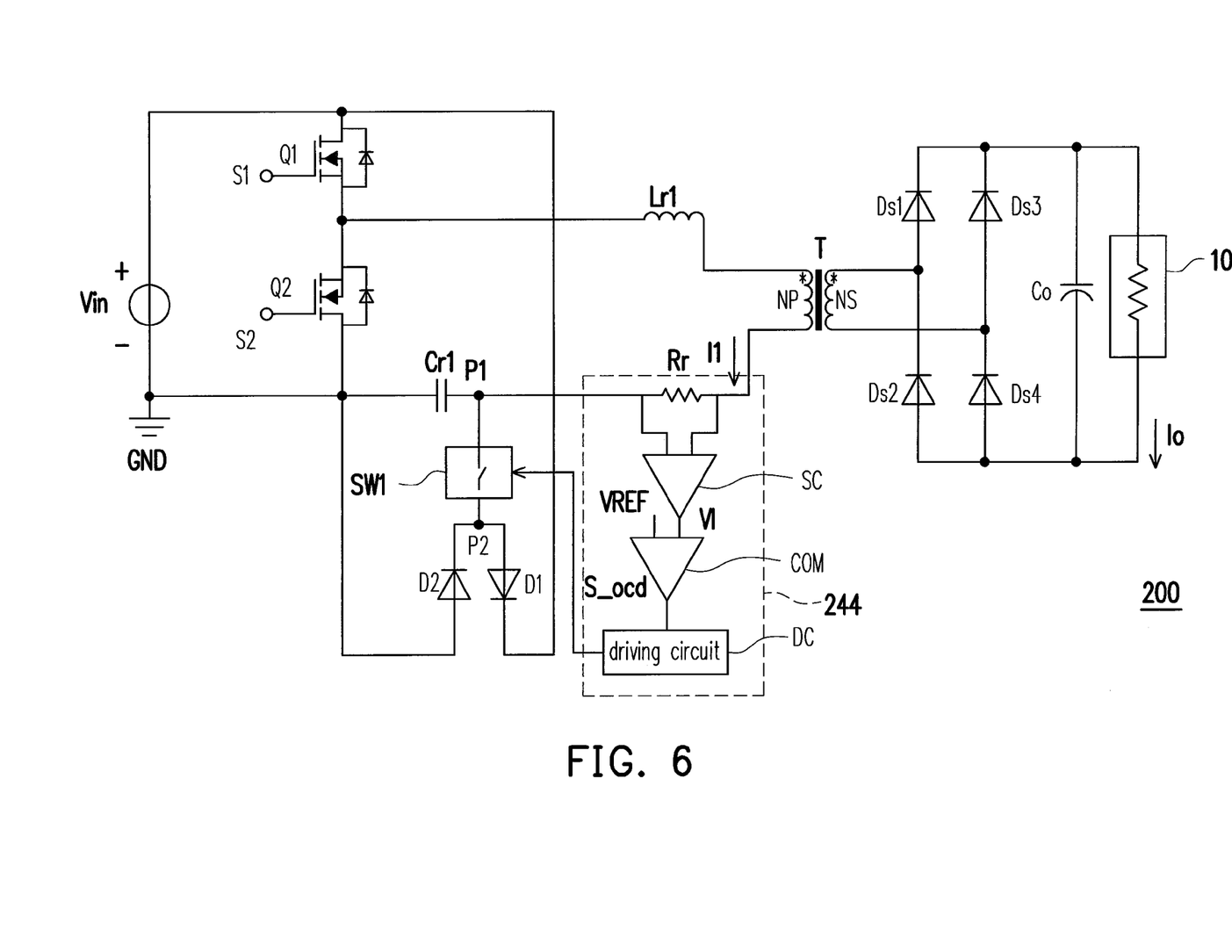
FIG. 6 is a schematic functional block diagram of an over-current determining circuit according to an embodiment of the invention.
Figure 7:
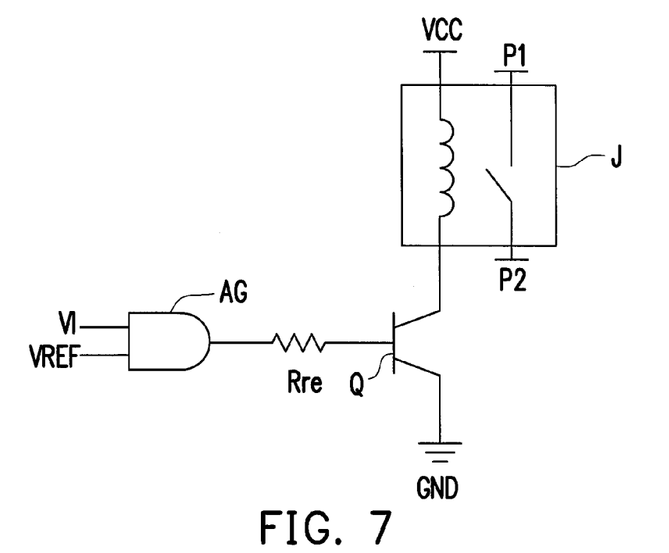
FIG. 7 is a schematic circuit diagram of an over-current determining circuit according to the embodiment shown in FIG. 6.

To explain the over-current detection and determination mechanism in the embodiments depicted in FIG. 2 to FIG. 5 more clearly, specific implementation of the over-current determining circuit is further provided in the embodiment depicted in FIG. 6 and FIG. 7. FIG. 6 is a schematic functional block diagram of an over-current determining circuit according to an embodiment of the invention. FIG. 7 is a schematic circuit diagram of an over-current determining circuit according to the embodiment shown in FIG. 6.

In order to make the embodiment be understood easily, the structure of the over-current determining circuit 244 is described with reference to the resonant converter 200 provided in the embodiment depicted in FIG. 2. However, the invention is not limited thereto. More specifically, the structure and the current detection mechanism of the over-current determining circuit 244 provided in the embodiment may be applied to each over-current determining circuit (e.g., 344, 444, and 544) described in the previous embodiments, respectively.

Please refer to FIG. 6 first. According to the present embodiment, the over-current determining circuit includes a sampling resistor Rr, a current sampling circuit SC, a comparing circuit COM, and a driving circuit DC. The sampling resistor Rr is serially coupled to the primary side circuit of the transformer T (i.e., on the path between a second terminal of the first resonant capacitor Cr1 and an opposite-polarity terminal of the primary winding NP). Two input terminals of the current sampling circuit SC are coupled across the sampling resistor Rr, and the current sampling circuit SC may determine the magnitudes of current I1 by detecting the voltage difference between the two terminals of the sampling resistor Rr and generate a detecting voltage V1 corresponding to the magnitude of current I1 accordingly. The comparing circuit COM is coupled to an output terminal of the current sampling circuit SC. The comparing circuit COM is configured to compare the detecting voltage V1 and a reference voltage VREF, and the comparison result of the comparing circuit COM indicates the relationship between the magnitude of the current I1 and the magnitude of a pre-determined current. The driving circuit DC controls the switch SW1 to be turned on and off according to the comparison result of the comparing circuit COM.

In detail, if the comparing circuit COM generates the comparison result that the detecting voltage V1 is larger than or equal to the reference voltage VREF, it is indicated that the over-current phenomenon of the load 10 may occur (i.e., the current I1 is larger than or equal to the pre-determined current). Here, the driving circuit DC may turn on the switch SW1 according to the comparison result of the comparing circuit COM, so as to form the conductible clamp path CP (i.e., a path of nodes P1 to P2), so that the cross voltage of the first resonant capacitor Cr1 is limited by the clamping diodes D1 and D2, and thereby the over-current phenomenon of the load 10 is restrained.

On the contrary, when the comparing circuit COM generates the comparison result that the detecting voltage V1 is smaller than the reference voltage VREF, it is indicated that the resonant converter 200 is in a normal work state (i.e, the current I1 is smaller than the pre-determined current). At this time, the driving circuit DC may turn off the switch SW1 according to the comparison result of the comparing circuit COM, so that the cross voltage of the first resonant capacitor Cr1 is not limited by the clamping diodes D1 and D2.

More specifically, the comparing circuit COM, the driving circuit DC, and the switch SW1 shown in FIG. 6 may be implemented according to the circuit configuration described in the embodiment depicted in FIG. 7. Please refer to FIG. 7. According to the present embodiment, the switch SW1 may be implemented in form of a relay J, the comparator COM may be implemented in form of an and gate AG, and the driving circuit DC may be implemented by means of the configuration of a current-limited resistor Rre and a transistor Q. With said circuit configuration, if the and gate AG receives the high-level detecting voltage V1, the and gate AG may generate an enable signal to turn on the transistor Q. The turned-on transistor Q may establish a current path between the source voltage VCC and the ground terminal GND. The winding part of the relay J may be excited according to the current on the current path, the switch part of the relay J is switched off in response to the excitation of the winding part, and the nodes P1 and P2 are electrically connected to establish a clamp path CP.

In the embodiments depicted in FIG. 6 and FIG. 7 the primary side current I1 is exemplarily detected, but the implementation of detecting the secondary side current (i.e., the load current Io) to achieve the over-current protection can be deduced by anyone having ordinary skill in the field according to the descriptions in the embodiments depicted in FIG. 6 and FIG. 7.

In addition, according to the descriptions in the embodiments depicted in FIG. 2 to FIG. 5, anyone having ordinary skill in the field should know that the resonant converter having the over-current protection mechanism, as described in the embodiment of the invention, is not limited to have a specific circuit configuration. More specifically, the asymmetrical half-bridge resonant converter, the concept of the over-current protection mechanism is applicable to the symmetrical half-bridge resonant converter, the full-bridge resonant converter, and other types of resonant converter, so that the cross voltage of the resonant capacitor may be exempted from the influence of the DC input voltage if the resonant converter works normally. On the other hand, the resonant converter described in an embodiment of the invention is not limited to have the circuit configurations disclosed in the previous embodiments; as long as the resonant converter is able to conduct or cut off the clamp path according to the over current to achieve the above-mentioned effects, the resonant converter falls with the scope of protection of the invention.

Figure 8:
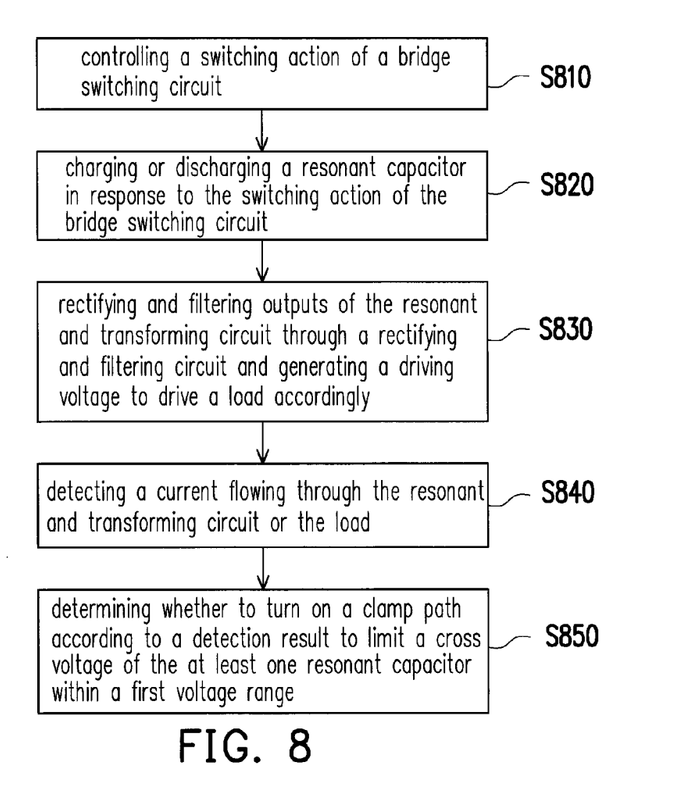
FIG. 8 is a flow chart of a controlling method of a resonant converter according to an embodiment of the invention.

FIG. 8 is a flow chart of a controlling method of a resonant converter according to an embodiment of the invention. The controlling method of the embodiment is adapted to control the resonant converter 100, 200, 300, 400, or 500 as shown in FIG. 1 to FIG. 5. Please refer to FIG. 8, the controlling method of the resonant converter provided in the embodiment includes following steps: controlling switching of a bridge switching circuit (e.g., the bridge switching circuit 110, 210, 310, 410, or 510) (step S810); charging or discharging a resonant capacitor (e.g., the resonant capacitor Cr1 or Cr2) in response to the switching of the bridge switching circuit (step S820); rectifying and filtering outputs of a resonant and transforming circuit (e.g., the resonant and transforming circuit 120, 220, 320, 420, or 520) by a rectifying and filtering circuit (e.g., the rectifying and filtering circuit 130, 230, 330, 430, or 530) and generating a driving voltage to drive a load (e.g., the load 10) accordingly (step S830); detecting a current flowing through the resonant and transforming circuit or the load (step S840), and determining whether to conduct/cut off the clamp path according to a detection result to limit a cross voltage of the resonant capacitor within a first voltage range (step S850).

More specifically, the step S850 may be accomplished by performing following steps: determining whether the current flowing through the resonant and transforming circuit or the load is larger than or equal to a pre-determined current or not; if the current flowing through the resonant and transforming circuit or the load is determined to be larger than or equal to the pre-determined current, an over-current protecting circuit (e.g., the over-current protecting circuit 140, 240, 340, 440, or 540) conducts the clamp path to limit the cross voltage of the at least one resonant capacitor within the first voltage range; if the current flowing through the resonant and transforming circuit or the load is determined to be smaller than the pre-determined current, the over-current protecting circuit cuts off the clamp path to exempt the cross voltage of the at least one resonant capacitor from being limited within the first voltage range.

The controlling method provided in the embodiment depicted in FIG. 8 may receive adequate support from the above descriptions with reference to FIG. 1 to FIG. 8, so that similar or repetitive descriptions will not be further provided hereinafter.

To sum up, the embodiments of the invention provide a resonant converter and a controlling method thereof. The resonant converter may determine whether the over-current phenomenon occurs at the load by detecting the current on its primary winding or the load. The resonant converter conducts the clamp path to provide the over-current protection when the over-current phenomenon occurs at the load, and cuts off the clamp path to exempt the resonant capacitance from being limited by the DC input voltage when the over-current phenomenon does not occur at the load. Therefore, the resonant converter may be free of extra limitation in terms of determination of the circuit parameters and the operation range, and the difficulty and costs of the overall circuit design may be further lowered.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A resonant converter adapted to provide a driving voltage to a load, the resonant converter comprising:
   a bridge switching circuit having a power terminal, wherein the bridge switching circuit receives a direct current input voltage through the power terminal;
   a resonant and transforming circuit coupled to the bridge switching circuit, and the resonant and transforming circuit having at least one resonant capacitor, wherein the at least one resonant capacitor is charged or discharged in response to switching of the bridge switching circuit;
   a rectifying and filtering circuit coupled to the resonant and transforming circuit, and the rectifying and filtering circuit being configured to rectify and filter outputs of the resonant and transforming circuit and generate the driving voltage accordingly; and
   an over-current protecting circuit coupled to the power terminal, and the over-current protecting circuit being coupled across the at least one resonant capacitor to form a clamp path,
   wherein the over-current protecting circuit is configured to detect a current flowing through the resonant and transforming circuit or the load and determine whether to conduct the clamp path according to a detection result to limit a cross voltage of the at least one resonant capacitor within a first voltage range.

2. The resonant converter according to claim 1, wherein when the over-current protecting circuit detects that the current flowing through the resonant and transforming circuit or the load is larger than or equal to a pre-determined current, the over-current protecting circuit conducts the clamp path to limit the cross voltage of the at least one resonant capacitor within the first voltage range, and when the over-current protecting circuit detects that the current flowing through the resonant and transforming circuit or the load is smaller than the pre-determined current, the over-current protecting circuit cuts off the clamp path to exempt the cross voltage of the at least one resonant capacitor from the limitation within the first voltage range, and
   wherein an upper limit of the first voltage range is the direct current input voltage.

3. The resonant converter according to claim 1, wherein the over-current protecting circuit comprises:
   a clamping circuit coupled to the power terminal;
   an over-current determining circuit configured to detect magnitudes of the current flowing through the resonant and transforming circuit or the load and generate an over-current determining signal accordingly; and
   a clamp switching circuit coupled between the clamping circuit and the at least one resonant capacitor, and the clamp switching circuit being turned on or off according to the over-current determining signal,
   wherein the clamp path is formed by the clamp switching circuit.

4. The resonant converter according to claim 3, wherein the rectifying and filtering circuit comprises:
   a first diode, a second diode, a third diode, and a fourth diode, wherein a cathode terminal of the first diode is coupled to a cathode terminal of the third diode, an anode terminal of the first diode is coupled to a cathode terminal of the second diode, an anode terminal of the second diode is coupled to an anode terminal of the fourth diode, and an anode terminal of the third diode is coupled to a cathode terminal of the fourth diode; and
   a filtering capacitor having a first terminal and a second terminal, the first terminal of the filter capacitor being coupled to the cathode terminal of the first diode, the cathode terminal of the third diode, and one terminal of the load, the second terminal of the filter capacitor being coupled to the anode terminal of the second diode, the anode terminal of the fourth diode, and the other terminal of the load.

5. The resonant converter according to claim 4, wherein the bridge switching circuit comprises:
   a first switch transistor, a first terminal of the first switch transistor being the power terminal, and a control terminal of the first switch transistor receiving a first control signal; and
   a second switch transistor, a first terminal of the second switch transistor being coupled to a second terminal of the first switch transistor, a second terminal of the second switch transistor being coupled to a ground terminal, and a control terminal of the second switch transistor receiving a second control signal.

6. The resonant converter according to claim 5, wherein the resonant and transforming circuit comprises:
   a first resonant capacitor, a first terminal of the first resonant capacitor being coupled to the ground terminal;
   a first resonant inductor, a first terminal of the first resonant inductor being coupled to the second terminal of the first switch transistor and the first terminal of the second switch transistor; and
   a transformer having a primary winding and a secondary winding, a common-polarity terminal of the primary winding being coupled to a second terminal of the first resonant inductor, an opposite-polarity terminal of the primary winding being coupled to a second terminal of the first resonant capacitor, a common-polarity terminal of the secondary winding being coupled to the anode terminal of the first diode and the cathode terminal the second diode, and an opposite-polarity terminal of the secondary winding being coupled to the anode terminal of the third diode and the cathode terminal of the fourth diode.

7. The resonant converter according to claim 6, wherein the clamping circuit comprises:
   a first clamping diode, a cathode terminal of the first clamping diode being coupled to the first terminal of the first switch transistor; and
   a second clamping diode, an anode terminal of the second clamping diode being coupled to the ground terminal, and a cathode terminal of the second clamping diode being coupled to an anode terminal of the first clamping diode.

8. The resonant converter according to claim 7, wherein the clamp switching circuit comprises:
   a switch, a first terminal of the switch being coupled to the anode terminal of the first clamping diode and the cathode terminal of the second clamping diode, a second terminal of the switch being coupled to the second terminal of the first resonant capacitor and the opposite-polarity terminal of the primary winding, and a control terminal of the switch being coupled to the over-current determining circuit.

9. The resonant converter according to claim 5, wherein the resonant and transforming circuit comprises:
   a first resonant capacitor, a first terminal of the first resonant capacitor being coupled to the ground terminal;
   a second resonant capacitor, a first terminal of the second resonant capacitor being coupled to a second terminal of the first resonant capacitor, and a second terminal of the second resonant capacitor being coupled to the first terminal of the first switch transistor;

a first resonant inductor, a first terminal of the first resonant inductor being coupled to the second terminal of the first switch transistor and the first terminal of the second switch transistor; and a transformer having a primary winding and a secondary winding, a common-polarity terminal of the primary winding being coupled to a second terminal of the first resonant inductor, an opposite-polarity terminal of the primary winding being coupled to the second terminal of the first resonant capacitor and the first terminal of the second resonant capacitor, a common-polarity terminal of the secondary winding being coupled to the anode terminal of the first diode and the cathode terminal of the second diode, and an opposite-polarity terminal of the secondary winding being coupled to the anode terminal of the third diode and the cathode terminal of the fourth diode.

10. The resonant converter according to claim 9, wherein the clamping circuit comprises:

a first clamping diode, a cathode terminal of the first clamping diode being coupled to the first terminal of the first switch transistor and the first terminal of the first resonant capacitor; and a second clamping diode, an anode terminal of the second clamping diode being coupled to the ground terminal, and a cathode terminal of the second clamping diode being coupled to an anode terminal of the first clamping diode.

11. The resonant converter according to claim 10, wherein the clamp switching circuit comprises:

a switch, a first terminal of the switch being coupled to the anode terminal of the first clamping diode and the cathode terminal of the second clamping diode, a second terminal of the switch being coupled to the second terminal of the first resonant capacitor and the first terminal of the second resonant capacitor, and a control terminal of the switch being coupled to the over-current determining circuit.

12. The resonant converter according to claim 5, wherein the resonant and transforming circuit comprises:

a first capacitor, a first terminal of the first capacitor being coupled to the first terminal of the first switch transistor;

a second capacitor, a first terminal of the second capacitor being coupled to a second terminal of the first capacitor, and a second terminal of the second capacitor being coupled to the ground terminal;

a first resonant capacitor, a first terminal of the first resonant capacitor being coupled to the second terminal of the first switch transistor and the first terminal of the second switch transistor;

a first resonant inductor, a first terminal of the first resonant inductor being coupled to a second terminal of the first resonant capacitor; and a first transformer, having a primary winding and a secondary winding, an common-polarity terminal of the primary winding being coupled to a second terminal of the first resonant inductor, an opposite-polarity terminal of the primary winding being coupled to the second terminal of the first capacitor and the first terminal of the second capacitor, a common-polarity terminal of the secondary winding being coupled to the anode terminal of the first diode and the cathode terminal of the second diode, and the opposite-polarity terminal of the secondary winding being coupled to the anode terminal of the third diode and the cathode terminal of the fourth diode.

13. The resonant converter according to claim 12, wherein the clamping circuit comprises:

a second transformer, having a primary winding and a secondary winding, a common-polarity terminal of the primary winding being coupled to the first terminal of the first resonant capacitor, the opposite-polarity terminal of primary winding being coupled to the second terminal of the first resonant capacitor;

a first clamping diode, an anode terminal of the first clamping diode being coupled to a common-polarity terminal of the secondary winding of the second transformer; and a second clamping diode, an anode terminal of the second clamping diode being coupled to the opposite-polarity terminal of the secondary winding of the second transformer, and a cathode terminal of the second clamping diode being coupled to a cathode terminal of the first clamping diode.

14. The resonant converter according to claim 13, wherein the clamp switching circuit comprises:

a switch, a first terminal of the switch being coupled to the cathode terminal of the first clamping diode and the cathode terminal of the second clamping diode, a second terminal of the switch being coupled to the first terminal of the filtering capacitor, and a control terminal of the switch being coupled to the over-current determining circuit.

15. The resonant converter according to claim 4, wherein the bridge switching circuit comprises:

a first switch transistor, a first terminal of the first switch transistor being the power terminal, and a control terminal of the first switch transistor receiving a first control signal;

a second switch transistor, a first terminal of the second switch transistor being coupled to a second terminal of the first switch transistor, a second terminal of the second switch transistor being coupled to a ground terminal, and a control terminal of the second switch transistor receiving a second control signal;

a third switch transistor, a first terminal of the third switch transistor being coupled to the first terminal of the first switch transistor, and a control terminal receiving a third control signal; and a fourth switch transistor, a first terminal of the fourth switch transistor being coupled to a second terminal of the third switch transistor, a second terminal of the fourth switch transistor being coupled to the ground terminal, and a control terminal of the fourth switch transistor receiving a fourth control signal.

16. The resonant converter according to claim 15, wherein the resonant and transforming circuit comprises:

a first resonant capacitor;

a first resonant inductor, a first terminal of the first resonant inductor being coupled to the second terminal of the first switch transistor and the first terminal of the second switch transistor;

a second resonant inductor, a first terminal of the second resonant inductor being coupled to the second terminal of the third switch transistor and the first terminal of the fourth switch transistor; and a transformer, having a first primary winding, a second primary winding, and a secondary winding, a common-polarity terminal of the first primary winding being coupled to a first terminal of the first resonant capacitor, an opposite-polarity terminal of the first primary winding being coupled to a second terminal of the first resonant inductor, a common-polarity terminal of the second primary winding being coupled to a second terminal of the second resonant inductor, an opposite-polarity terminal of the second primary winding being coupled to a second terminal of the first resonant capacitor, a common-polarity terminal of the secondary winding being coupled to the anode terminal of the first diode and the cathode terminal of the second diode, and an opposite-polarity of the secondary winding terminal being coupled to the anode terminal of the third diode and the cathode terminal of the fourth diode.

17. The resonant converter according to claim 16, wherein the clamping circuit comprises:
    a first clamping diode, a cathode terminal of the first clamping diode being coupled to the first terminal of the first switch transistor;
    a second clamping diode, an anode terminal of the second clamping diode being coupled to the ground terminal, and a cathode terminal of the second clamping diode being coupled to an anode terminal of the first clamping diode;
    a third clamping diode, a cathode terminal of the third clamping diode being coupled to the cathode terminal of the first clamping diode; and
    a fourth clamping diode, an anode terminal of the fourth clamping diode being coupled to the ground terminal, and a cathode terminal of the fourth clamping diode being coupled to an anode terminal of the third clamping diode.

18. The resonant converter according to claim 17, wherein the clamp switching circuit comprises:
    a first switch, a first terminal of the first switch being coupled to the anode terminal of the first clamping diode and the cathode terminal of the second clamping diode, a second terminal of the first switch being coupled to the first terminal of the first resonant capacitor, and a control terminal of the first switch being coupled to the over-current determining circuit; and
    a second switch, a first terminal of the second switch being coupled to an anode terminal of the third clamping diode and the cathode terminal of the fourth clamping diode, a second terminal of the second switch being coupled to the second terminal of the first resonant capacitor, and a control terminal of the second switch being coupled to the over-current determining circuit.

19. A controlling method of a resonant converter, wherein the resonant converter comprises a bridge switching circuit, a resonant and transforming circuit, a rectifying and filtering circuit, and an over-current protecting circuit, the resonant and transforming circuit has at least one resonant capacitor, and the over-current protecting circuit is coupled across the at least one resonant capacitor to form a clamp path, and the controlling method comprises:
    controlling switching of the bridge switching circuit, wherein the bridge switching circuit receives a direct current input voltage through a power terminal;
    charging or discharging the at least one resonant capacitor in response to the switching of the bridge switching circuit;
    rectifying and filtering outputs of the resonant and transforming circuit and generating a driving voltage by the rectifying and filtering circuit to drive a load accordingly;
    detecting a current flowing through the resonant and transforming circuit or the load; and
    determining whether to conduct the clamp path according to a detection result to limit a cross voltage of the at least one resonant capacitor within a first voltage range.

20. The controlling method according to claim 19, wherein the step of determining whether to conduct the clamp path according to the detection result to limit the cross voltage of the at least one resonant capacitor within the first voltage range comprises:
    determining whether the current flowing through the resonant and transforming circuit or the load is larger than or equal to a pre-determined current or not;
    if the current flowing through the resonant and transforming circuit or the load is determined to be larger than or equal to the pre-determined current, conducting the clamp path by the over-current protecting circuit to limit the cross voltage of the at least one resonant capacitor within the first voltage range; and
    if the current flowing through the resonant and transforming circuit or the load is determined to be smaller than the pre-determined current, cutting off the clamp path by the over-current protecting circuit to exempt the cross voltage of the at least one resonant capacitor from the limitation within the first voltage range,
    wherein an upper limit of the first voltage range is the direct current input voltage.

* * * * *